United States Patent [19]
Gerndt et al.

[11] Patent Number: 5,639,054
[45] Date of Patent: Jun. 17, 1997

[54] PIVOT MOUNT FOR EXTERIOR SIDE-MOUNTED REARVIEW MIRROR

[75] Inventors: Paul G. Gerndt, Chicago, Ill.; Rick J. Kirin, Royal Oak, Mich.; William M. Perry, Palestine, Ohio

[73] Assignee: United Technologies Automotive Systems, Inc., Detroit, Mich.

[21] Appl. No.: 333,540

[22] Filed: Nov. 2, 1994

[51] Int. Cl.$^6$ ............... B60R 1/06; G02B 7/18
[52] U.S. Cl. ............ 248/478; 248/479; 248/289.11; 359/841; 359/872
[58] Field of Search .................. 248/478, 479, 248/474, 475, 477; 359/841, 872, 73, 478, 479, 289.11

[56] References Cited

U.S. PATENT DOCUMENTS

| | | | |
|---|---|---|---|
| 4,523,735 | 6/1985 | Beck et al. | 248/479 |
| 4,786,156 | 11/1988 | Kotani et al. | 248/479 |
| 4,789,232 | 12/1988 | Urbanek | 348/475.1 |
| 5,005,797 | 4/1991 | Maekawa et al. | 248/479 |
| 5,148,325 | 9/1992 | Wang | 359/841 |
| 5,166,832 | 11/1992 | Zychowicz | 248/479 |
| 5,432,640 | 7/1995 | Gilbert et al. | 248/478 |

FOREIGN PATENT DOCUMENTS

| | | | |
|---|---|---|---|
| 0223923 | 8/1986 | European Pat. Off. | 359/872 |
| 4031032 | 10/1990 | Germany | 248/478 |

*Primary Examiner*—Timothy P. Callahan
*Assistant Examiner*—Terry L. Englund
*Attorney, Agent, or Firm*—Howard & Howard

[57] ABSTRACT

An exterior side-mounted rearview mirror assembly includes a mirror shell having a sleeve mounted on a pivot cup. The pivot cup is selectively rotatable about the central axis of a post fixed to a vehicle. The assembly has complementary interlocking structure located at the base of the pivot cup and adjacent the base of the post. In combination with a spring and retainer which holds the spring against the pivot cup, these complementary structures allow for the selective rotation of the pivot cup about the post. The shell is mounted to the pivot cup in a non-rotatable fashion, by simply sliding the sleeve onto the pivot cup. The method of assembling the mirror assembly is thus simplified.

17 Claims, 4 Drawing Sheets

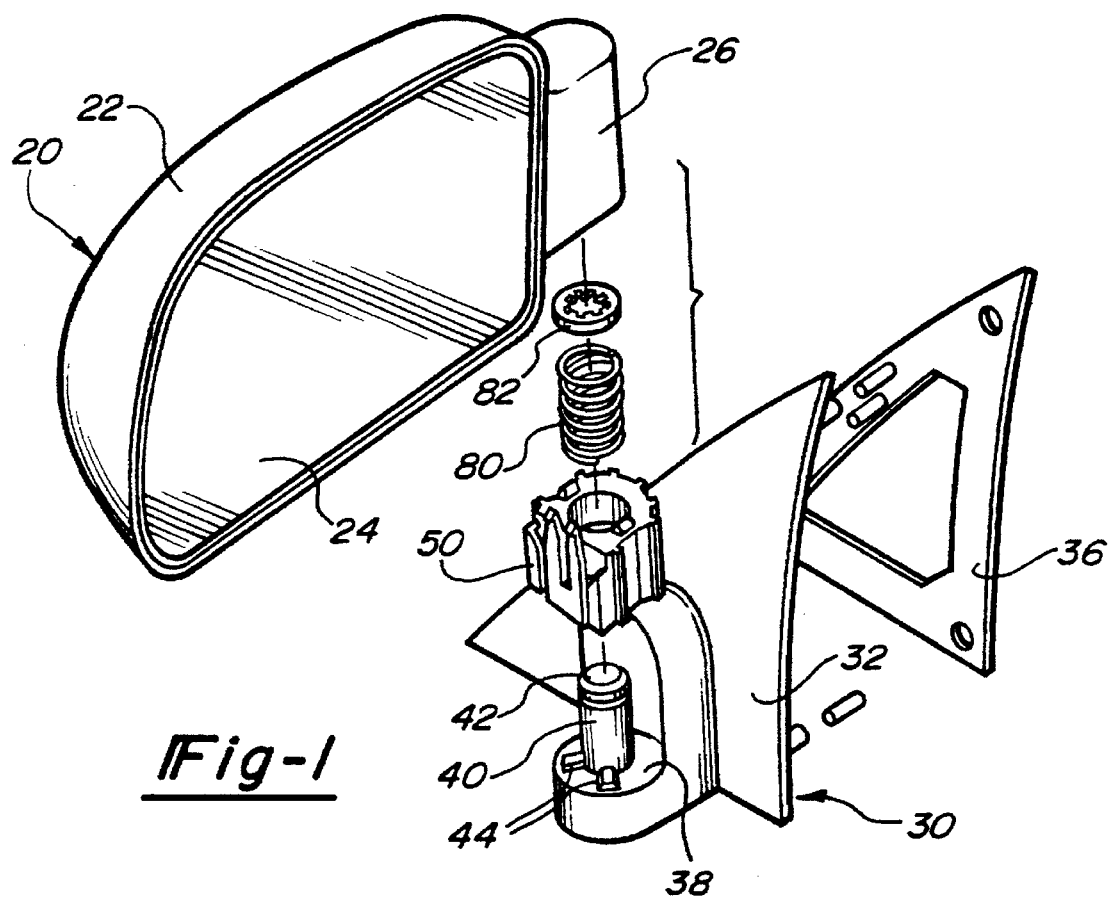
Fig-1
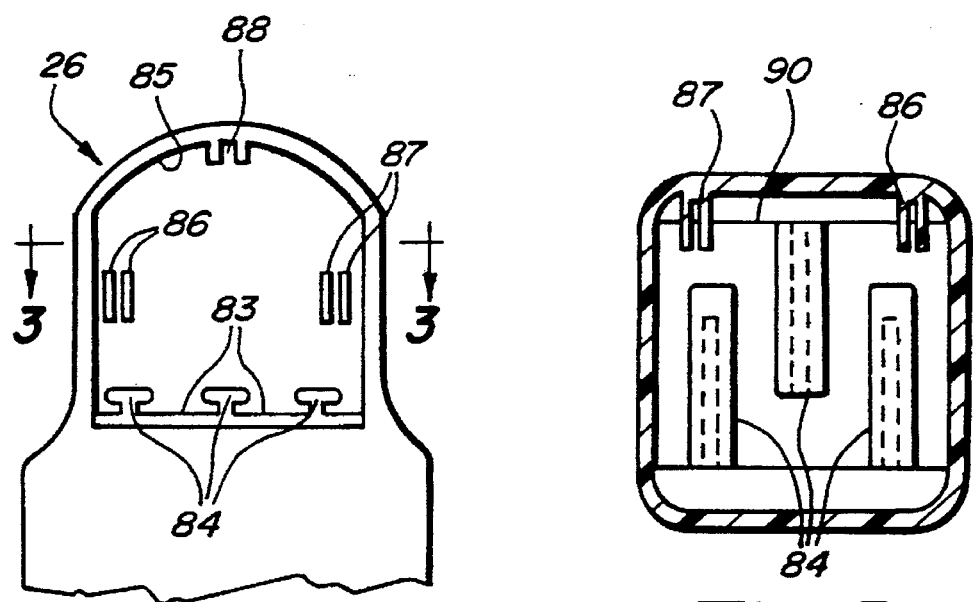
Fig-2
Fig-3

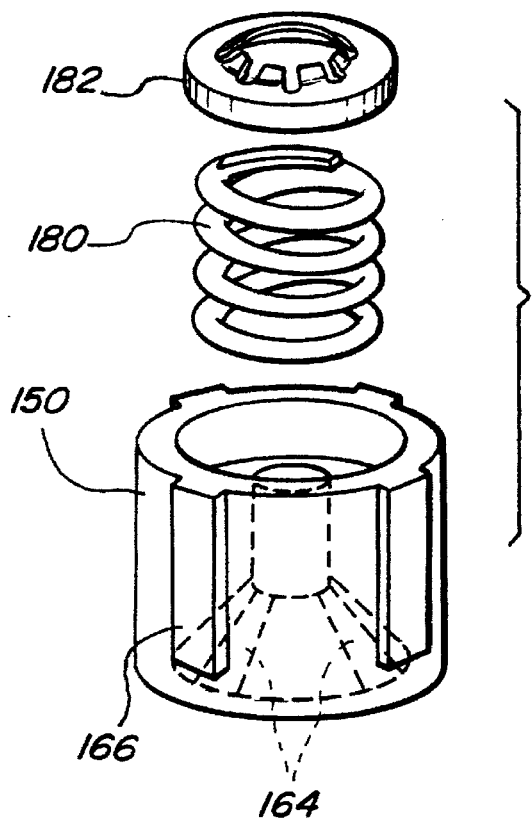
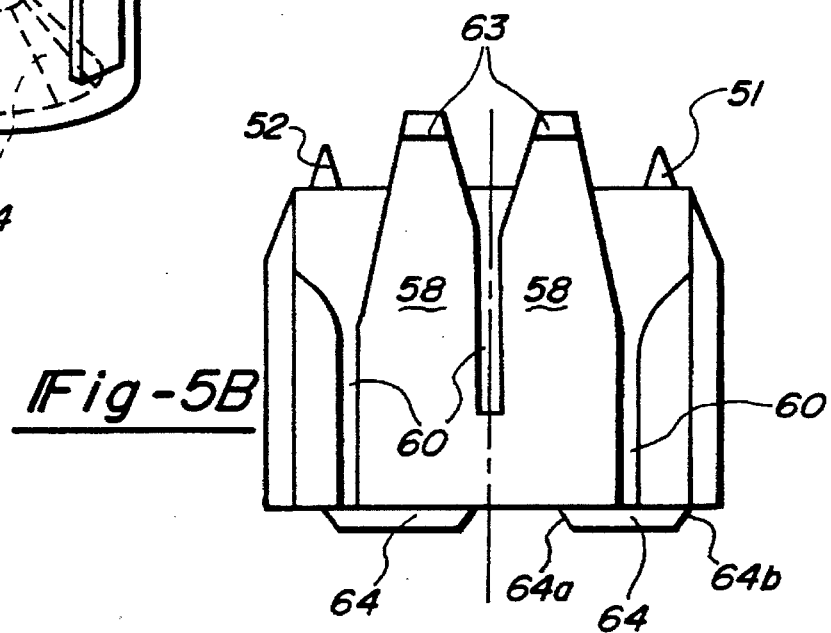

PIVOT MOUNT FOR EXTERIOR SIDE-MOUNTED REARVIEW MIRROR

BACKGROUND OF THE INVENTION

This invention relates to exterior side-mounted rearview mirror assemblies and a method for constructing such assemblies. The assembly allows for the selective rotation of the mirror between a tucked-in position and an extended, operational position. A pivot cup receives the sleeve of a mirror shell in a non-rotatable fashion. The pivot cup is selectively rotatable about a post between the tucked-in and operational positions. The invention also relates to a method of manufacturing the mirror assemblies.

Exterior side-mounted rearview mirrors are found on almost every modern vehicle. These mirrors, typically located adjacent the lower forward corner of the front and passenger side windows, extend out from the windows a significant distance, particularly on larger vehicles such as utility trucks and mini-vans. For several reasons, it is desirous to be able to selectively position the rearview mirror toward the window in a tucked-in position. For instance, the owner of a vehicle may wish to tuck the side-mounted mirrors in when sending the vehicle through an automated carwash operation to avoid damage to the mirror.

For this reason, it has become customary to allow for rotation of the mirror about an axis between an extended operational position and a tucked in position. Typically, a mount allows the mirror to be held at two or three positions. The prior art assemblies contain a heavy plate which is bolted to the mirror, and also received on a post for rotation.

This assembly has been difficult to build. The connection between the plate and the mirror must be able to withstand the severe vibration that will be experienced by the vehicle generally, and the extending mirror in particular. The prior art has typically utilized the bolted heavy plate in an attempt to overcome and withstand this vibration. Further, the attachment of the bolted plate to the mirror, and then the attachment of the plate to the post, has proven difficult. Typically, the plate has been attached to the post through a spring and retainer connection. It has been difficult to complete this connection with the bolted plate. The plate must be attached to the post through a very restricted opening in the mirror shell making it very difficult to attach and disassemble for service. Further, the mirror typically could not be fully preassembled prior to the attachment of the plate to the post. Modern production facilities would like to have as much preassembly freedom as possible. It is desirable to reduce the number, size and weight of vehicle components, and also improve the assembly of the components. Thus, a need exists for improved side-mounted rearview mirror assemblies which allow for selective rotation, but which are easy to assemble and are lightweight.

SUMMARY OF THE INVENTION

A disclosed mirror assembly preferably includes a pivot cup selectively rotatable about a post which is attached to a vehicle. The assembly has complementary interlocking structure located near the base of the pivot cup and post. The complementary structure allows for the selective rotation of the pivot cup about the post.

A shell which carries the mirror has a sleeve mounted over the pivot cup in a non-rotatable fashion. The shell and sleeve are mounted by a non-rotation structure for receiving the pivot cup located in the sleeve, which fits on corresponding non-rotation structure located on about the periphery of the pivot cup.

In a preferred embodiment of this invention, the non-rotatable structure between the pivot cup and mirror shell is slidably connected. Thus, an operator merely slides the mirror shell onto the pivot cup, preferably after the pivot cup has been connected to the post. The entire mirror housing may be preassembled prior to attachment to the pivot cup. The connection of the pivot cup to the post is relatively easy, as the connection is exposed to the operator. By simply sliding the mirror shell onto the post, the final assembly of the mirror is easily completed.

In one preferred embodiment, the non-rotation structure between the pivot cup and the mirror shell is formed at several different vertical and horizontal planes. In this way, the mirror shell and pivot cup are well-connected, and will be able to easily resist vibration.

In this embodiment, t-shaped sliding connections are formed on the mirror shell, and are received within corresponding slots on the pivot cup. The pivot cup also includes members which slide within a slot on the mirror shell. Further, the pivot cup includes resilient fingers which snap over an edge of the mirror shell in a fully assembled position, at a location vertically upwardly of the t-shaped connections. Finally, the pivot cup includes wedges which are forced upwardly between pedals extending downwardly from an upper surface of the shell. The wedges and pedals provide a resilient counter-force tightly holding the mirror shell and pivot cup together. In other embodiments of this invention, the pivot cup may have splines, which are structured to be easily accommodated within corresponding openings in the mirror shell. The pivot cup is preferably mounted on a post attached to the vehicle such that the mirror may be positioned at any one of several positions relative to the vehicle. This limited position connection is achieved by one of two embodiments. In a first embodiment, detents are formed adjacent the post and on the pivot cup. The detents limit the positions of the mirror relative to the vehicle.

In an inventive embodiment, the post is formed with a conical lower surface including flat surfaces. The pivot cup has mating flat surfaces, such that the pivot cup may be mounted on said post at a limited number of angular positions.

Preferably, rotation of the shell around a central axis of the post provides for at least one position where the longitudinal axis of the mirror is roughly perpendicular to the longitudinal axis of the vehicle and another position where the longitudinal axis of the mirror is substantially parallel with the longitudinal axis of the vehicle.

In a method of assembling a mirror according to this invention, the pivot cup is initially attached on the post. The mirror may then be simply slid onto the pivot cup, completing the mirror connection. This assembly requires many fewer steps, and is much simpler than the prior art assemblies. As such, the present invention provides valuable benefits in the field of side mounted mirrors.

These and other features of the present invention will be best understood from the following specification and drawings, of which the following is a brief description.

BRIEF DESCRIPTION OF THE DRAWINGS

FIG. 1 is an exploded perspective view of a first embodiment mirror assembly of this invention.

FIG. 2 is a bottom plan view of the sleeve of the mirror assembly of FIG. 1.

FIG. 3 is a cross-sectional view of the sleeve of FIG. 2, in the direction of arrows 3—3.

FIG. 5B is a side view of the pivot cup of FIG. 4.

FIG. 11 is a perspective view of a pivot cup associated with the embodiment illustrated in FIG. 9 of the invention.

DETAILED DESCRIPTION OF THE PREFERRED EMBODIMENTS OF THE INVENTION

Figure 4:
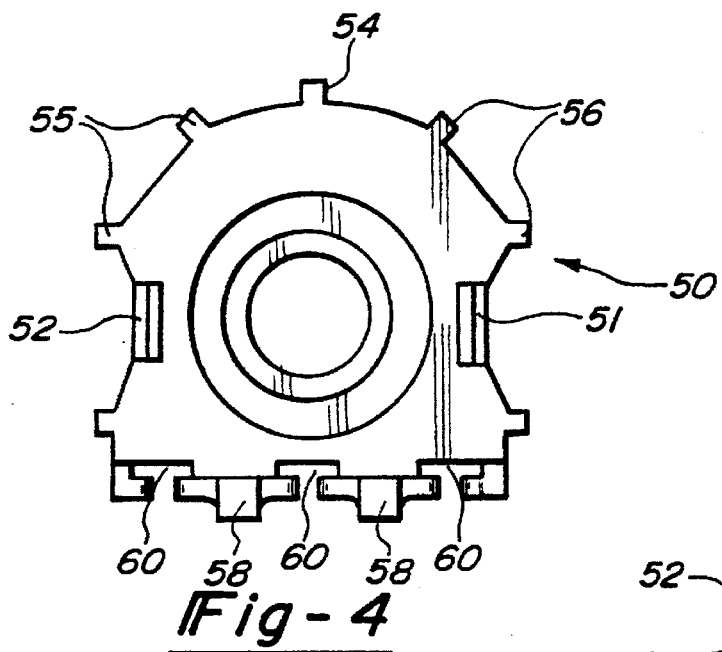
FIG. 4 is a top plan view of the pivot cup of the mirror assembly of FIG. 1.

FIG. 1 shows the exterior side-mounted rearview mirror assembly including its components: a shell 20, a retainer 82, a spring 80, a pivot cup 50 and support piece 30. A portion of a vehicle 36 to which the assembly attaches is also shown. The shell 20 includes a mirror frame 22 which houses a mirror 24 and may also house a motor (not shown) behind the mirror which adjusts the position of the mirror 24 for the operator of the vehicle. The mirror shell also includes a sleeve 26 located adjacent the mirror frame 22. As described in greater detail below, the sleeve 26 attaches the mirror shell 20 in a non-rotatable fashion to the pivot cup 50 of the assembly. The mirror shell 22 is made of a known rigid plastic material, as is commonly used in the automotive industry.

Support piece 30 includes a member 32 for attachment of the assembly to a vehicle 36. The support piece 30 also includes a base 38 having detents 44, and a post 40 having a free end 42 which faces upwardly. The detents 44 comprise a structure for interlocking with complementary interlocking structure located at the base of the pivot cup 50 (see FIG. 5B) to provide stops for selective rotation of the pivot cup 50 about the central axis of the post 40.

The assembly also includes a spring 80 mounted about the post 40 and a retainer 82 which holds the spring 80 down in a compressed state thereby applying a pressure or downward force holding the pivot cup 50 against the base 38 of the support piece.

The prior art has utilized detents to limit the number of angular positions between the mirror and the vehicle. Further, the prior art has utilized a spring and retainer connection to connect the prior art plate to the post. Applicant's invention eases the use of these structures by developing the inventive pivot cup which facilitates the assembly of the mirror to the post.

The novel side-mounted rearview mirror assembly of the invention herein incorporates a unique construction which allows the operator of a vehicle to rotate the mirror frame between several predetermined positions including a "tucked-in" position where the mirror sits adjacent the side of a vehicle, and an operational position where the mirror is extended relative to the vehicle. The mirror assembly is assembled much easier than prior side-mounted rearview mirror assemblies. The novel pivot cup provides for a simpler, less time-consuming method of attaching the mirror shell to the post compared to the prior art. The pivot cup is easily fixed to the post, and the mirror shell is merely slid onto the pivot cup.

As shown in FIGS. 2 and 3, the mirror sleeve 26 contains t-shaped rim members 84 and fins 88 which define a slot to receive corresponding members on the pivot cup 50. This structure slidably receives the pivot cup 50 in a non-rotatable fashion, as will be described below. The mirror sleeve 26 also contains petals 86 and 87 which extend down from the roof of the sleeve 26 to engage wedges located on the pivot cup 50 to maintain the shell 20 tightly attached to the pivot cup 50, as will be described below.

Figure 5A:
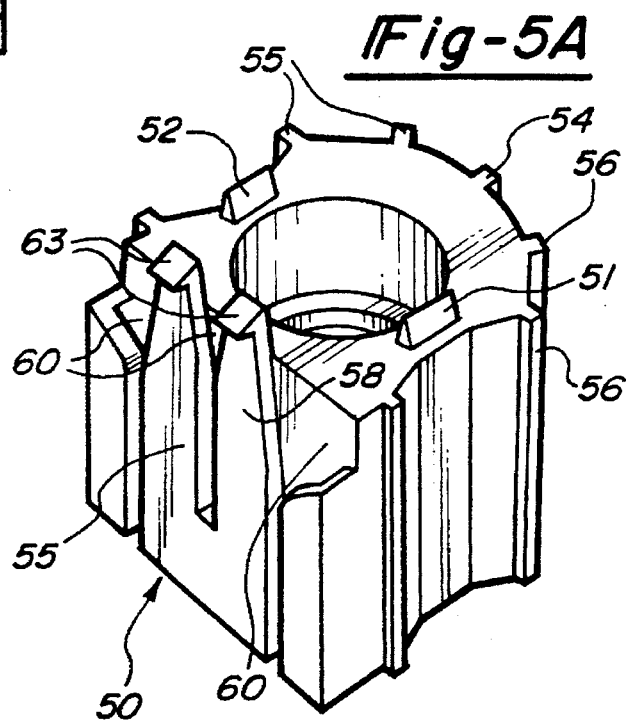
FIG. 5A is perspective view of the pivot cup of FIG. 4.

As shown in FIGS. 4, 5A and 5B, pivot cup 50 contains teeth 54, 55 and 56, and finger members 58, all of which extend from the pivot cup. The teeth and finger members attach the sleeve 26 to the pivot cup 50 in a non-rotatable fashion, as will be described below. Pivot cup 50 also contains wedges 51 and 52 which extend from the top of the pivot cup and engage with the sleeve petals 86 and 87, inhibiting up and down motion of the mirror shell 20, as will be described below.

Sleeve 26 is slid onto pivot cup 50, finger members 58 have end branches 63 that move along inner face 83 of the sleeve, side teeth 56 and 55 move along inner edge 85, middle tooth 54 engages in the slot defined by fins 88, and the t-shaped rim members 84 engage with grooves 60 of the pivot cup 50. The engagement of the t-shaped rim members and grooves 60, and middle tooth 54 and the slot defined by fins 88, prevents rotation of the sleeve 26 around the pivot cup 50. Teeth 55 and 56 contact an inner surface of sleeve 26, providing additional support.

Figure 6A:
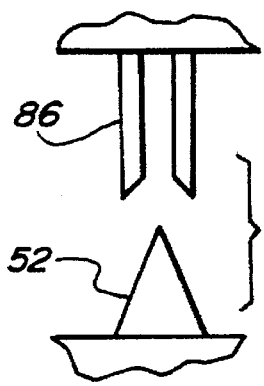
FIGS. 6A, 6B and 6C illustrate a wedge and petal arrangement of the invention.
Figure 6B:
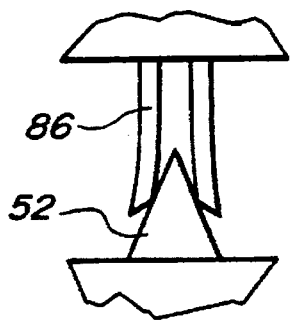
Figure 6C:
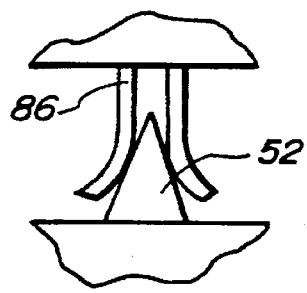

As the top of the pivot cup 50 approaches the roof of the sleeve 26, finger end branches 63 approach engagement with edge line 90 of the sleeve. Wedges 51 and 52 engage between petals 86 and 87 as demonstrated in FIGS. 6A through 6C. As shown in FIG. 6A, wedge 52 approaches petals 86 as the top of pivot cup 50 approaches the roof of sleeve 26. As shown in FIG. 6B, wedge 52 then engages with the petals 86. With additional downward movement of mirror shell 20, wedge 52 forces the lower free ends of the petals 86 apart. The petals resist such force, making it increasingly more difficult to slide the sleeve down over the pivot cup. With additional downward movement, fingers end branches 63 snap over sleeve edge line 90 and wedge 52 is forced between petals 86 further apart locking the sleeve 26 in place over pivot cup 50. Although the action of only petals 86 is illustrated, it should be understood that petals 87 would be functioning identically. The engagement of wedge 52 with the petal 86, as shown in FIG. 6C, maintains the sleeve 26 in place on the pivot cup 50 providing a secure engagement.

In this embodiment, the non-rotaatable structure connecting the pivot cup 50 and the mirror shell 20 is formed in several different planes. The t-shaped rim members 84 and grooves 60 and the fins 88 and tooth 54 are formed parallel to a plane extending generally through the vertical. The finger and edge connection 63 and 90 extend in a plane that is generally parallel to the horizontal. The wedge and petal connection 86, 87, 51, and 52 is in a plane which is skew to the horizontal. By providing the connections in several different non-parallel planes, the present invention provides greater resistance to vibration.

Pivot cup detents 64 mesh with base detents 44. With the downward force supplied by the spring and retainer arrangement, the detents inhibit rotation of the pivot cup about the central axis of the post 40. However, when sufficient rotational force is applied to the pivot cup 50, as in the case where an operator of a vehicle rotates the mirror shell 20 around the central axis of the post 40, the base detents 44 and pivot cup detents 64 slide over each other from one interlocking position to another. The side edges of the detents provide sufficient resistance to keep the pivot cup 50 and base 38 in a locked position, but allow for easy sliding of the detents over each other. As such, the mirror shell 20 rotates between predetermined positions around the central axis of the post 40.

Figure 7:
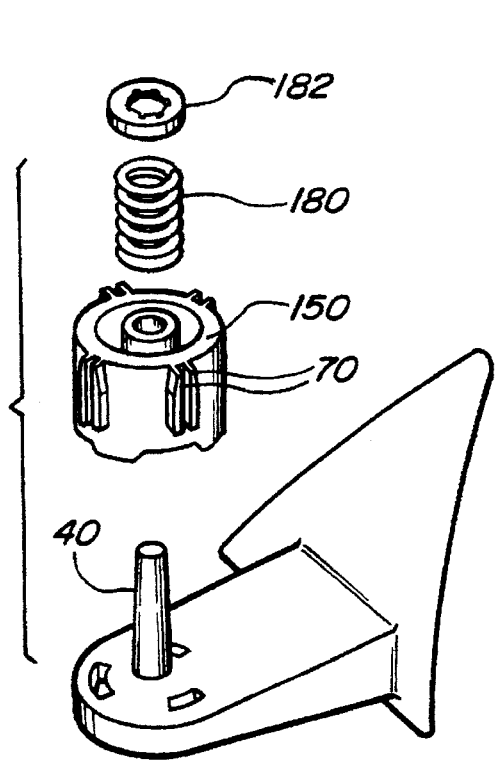
FIG. 7 is an exploded view of an alternative embodiment of the invention.
Figure 8:
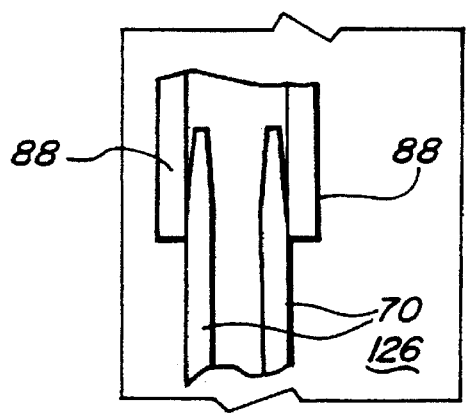
FIG. 8 is a partial view of a spline feature associated with the embodiment illustrated in FIG. 7.

Another embodiment of the invention is shown in FIGS. 7 and 8. Pivot cup 150 has splines 70 located around the periphery of the pivot cup which engage with fins 88 on the mirror sleeve 126 (shown schematically) such that the sleeve 126 receives pivot cup 150 in a non-rotatable fashion. Splines 70 are formed on the periphery of pivot cup 150 with two parts each having converging outer edges at an upper end. The converging ends facilitate the engagement of the splines 70 with the slot defined by the fins 88. As sleeve 126 is positioned over pivot cup 150, the assembler of the mirror assembly will find it easier to engage the splines 70 with fins 88, since the space between the fins 88 is sufficiently large enough to easily receive the converging upper ends of splines 70. However, the fins 88 are spaced such that they receive the splines in a snug and secure fashion so that the sleeve 26 is not able to rotate about the pivot cup 150.

Figure 9:
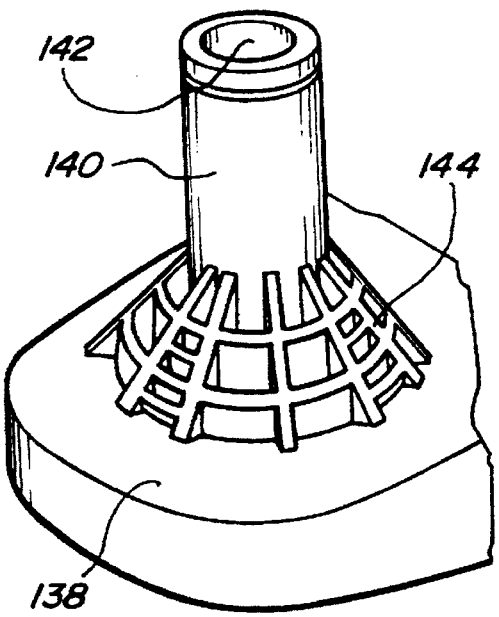
FIG. 9 is a perspective view of another alternative post and base arrangement of this invention.
Figure 10:
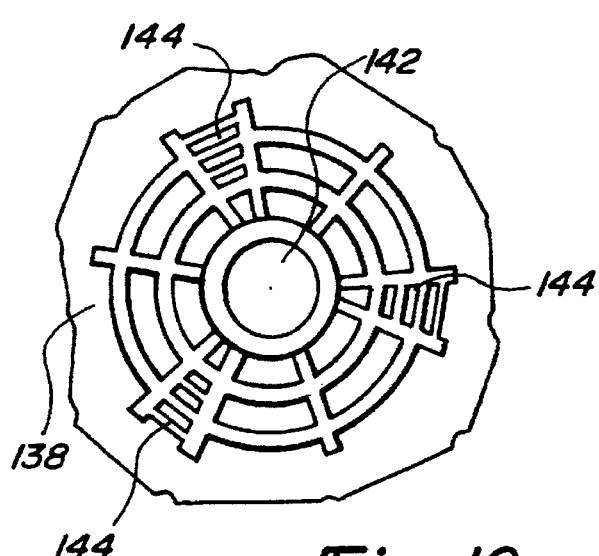
FIG. 10 is a top plan view of the arrangement in FIG. 9.

FIGS. 9, 10 and 11 show an alternative embodiment of the complementary interlocking structure. The post 140 itself carries the complementary interlocking structure. The end of the post 140 attached to base 138 comprise a webbed conical structure having flat portions 144 extending away from the central axis of the post 140. The webbed structure provides more strength at the post. The pivot cup 150 has complementary flat portions 164 adjacent the base of the pivot cup 150. Flat portions 164 on pivot cup 150 match the flat portions 144 of the webbed conical structure. The flat portions extend for a greater distance than prior art detents. This provides a more secure connection. The post 140 receives the pivot cup 150 axially over the free end 142 of the post 140. The pivot cup 150 is held in place over the post 140 by a spring 180 and a retainer 182. The spring 180 is held in place axially over the post 140 in a compressed state by the retainer 182 such that the spring 180 applies a downward force holding the pivot cup 150 onto the base 138. When the flat portions of the base 144 and pivot cup 164 interconnect, the pivot cup 150 is in a releasably locked position. When a sufficient force is applied to the pivot cup 150 via a force applied to the mirror shell 20, the flat portions 144 and 164 disengage and slide over the conical portions to a position where the flat portions engage once again.

A method of assembling the first embodiment will now be disclosed. Although the structure of the other two embodiments differ, the assembly is generally the same. In a method of assembling a rearview mirror assembly according to the invention herein, pivot cup 50 is placed axially over post 40. Spring 80 is then placed on post 40 and compressed. Retainer 82 is then placed over compressed spring 80 positioning the pivot cup 50 in a releasably locked position on post 40. Mirror sleeve 26 is then slid onto the pivot cup.

A preferred description of this invention has been disclosed; however, a worker of ordinary skill in the art would recognize that certain modifications would come within the scope of this invention. For that reason, the following claims should be studied in order to determine the true scope and content of this invention.

We claim:

1. An exterior, side-mounted, rearview mirror assembly comprising:

a shell including a mirror frame receiving a rearview mirror, and a sleeve mounted to said mirror frame, said sleeve having means for receiving a pivot cup within said sleeve in a locked, non-movable fashion;

a support piece comprising a member for attachment to a vehicle, a base adjacent said member, and a post having an attached end adjacent said base and a free end which faces upwardly, said support piece having means for interlocking with complementary means on said pivot cup for selective rotation of said pivot cup about said post;

said pivot cup located on, and selectively rotatable about, said post, and having said complementary means for interlocking adjacent a base of said pivot cup and means for locked, non-movable attachment of said sleeve located about the periphery of said pivot cup such that said pivot cup and said sleeve can rotate together on said post; and said means for locked, non-moveable attachment of said pivot cup and said sleeve includes structure which are slidably interconnected, and which are formed for contact between said sleeve and said pivot cup in at least two non-parallel planes.

2. The mirror assembly as recited in claim 1, wherein a spring bias member is secured on said post and biases said pivot cup onto said base.

3. The rearview mirror assembly as recited in claim 1, wherein said sleeve for receiving said pivot cup includes a plurality of t-shaped rim members located around an inner periphery of said sleeve, and an edge adjacent an upper end of said sleeve, and said pivot cup means for attachment comprises grooves for receiving said t-shaped rim members and finger members which snap over said edge whereby said shell attaches to said pivot cup in a snug, locked and non-movable fashion.

4. The rearview mirror assembly as recited in claim 3, wherein said sleeve further comprises pairs of petals extending down from a roof of said sleeve and said pivot cup further comprises wedges corresponding to said petals located on the top of said pivot cup which engage with said petals providing a tight fit for said sleeve on said pivot cup.

5. An exterior mirror assembly comprising:

a shell comprising a mirror frame for receiving a rearview mirror and a sleeve mounted to said mirror frame, said sleeve having a first structure for mounting a pivot cup within said sleeve in a non-rotatable fashion;

a support piece for attachment to a vehicle, including a base and a post having a first end adjacent said base and a second end which is unattached and facing upwardly, said support piece having a second structure for interlocking with complementary structure on said pivot cup for selective rotation of said pivot cup about said post;

said pivot cup located on said post, and having said complementary structure for interlocking, and non-rotatable structure for non-rotatable attachment to said shell and sleeve, said non-rotatable structure located about an outer peripheral surface of said pivot cup, said non-rotatable structure on said pivot cup sliding into said first structure on said shell; and said non-rotatable structure is formed at at least two locations spaced circumferentially relative to a central axis of said post, said non-rotatable structure including splines formed by two spaced members on said outer peripheral surface of said pivot cup, and slots on an inner peripheral surface of said sleeve which receives said splines.

6. The mirror assembly as recited in claim 5, wherein said base of said support piece carries said second structure, and said second structure includes spaced detents on said base such that rotation of said shell around a central axis of said post provides for at least one position where the longitudinal axis of said mirror is roughly perpendicular to the longitudinal axis of the vehicle and another position where the longitudinal axis of said mirror is substantially parallel with the longitudinal axis of the vehicle.

7. The mirror assembly as recited in claim 5, wherein the non-rotatable structure between said sleeve and said pivot cup includes structure connecting the two in non-parallel planes.

8. The mirror assembly as recited in claim 5, wherein said pivot cup is rotatable with said sleeve on said post.

9. The mirror assembly as recited in claim 5, wherein said sleeve non-rotatable structure includes a plurality of t-shaped rim members located around an inner periphery of said sleeve and said pivot cup non-rotatable structure includes grooves for receiving said t-shaped rim members.

10. The mirror assembly as recited in claim 9, wherein said sleeve further comprises a pair of fins located in the inner periphery of said sleeve, said pair defining a slot for receiving a tooth on said pivot cup, and said pivot cup non-rotatable structure includes said tooth located on the periphery of said pivot cup.

11. The mirror assembly as recited in claim 10, wherein said pivot cup non-rotatable structure includes finger members and said sleeve further includes a ledge defining an edge line, with said finger members being snapped over said edge line locking said shell on said pivot cup.

12. The mirror assembly as recited in claim 11, wherein said sleeve further comprises pairs of petals extending from a roof of said sleeve, and said pivot cup further comprises a corresponding number of wedges, relative to the number of pairs of said petals, located on the top of said pivot cup which engage with said petals, providing a tight fit for said sleeve on said pivot cup.

13. The mirror assembly as recited in claim 12, wherein said second structure includes a first plurality of detents circumferentially spaced along said base, and said pivot cup complementary interlocking structure comprises a second plurality of detents adjacent a bottom of said pivot cup which interlock with said first plurality of detents.

14. An exterior mirror assembly comprising:
   a shell comprising a mirror frame for receiving a rearview mirror and a sleeve mounted to said mirror frame, said sleeve having a first structure for receiving a pivot cup within said sleeve in a non-rotatable fashion;
   a support piece for attachment to a vehicle, including a base and a post having a first end adjacent said base and a second end which is unattached and facing upwardly, said support piece having a second structure for interlocking with complementary structure on said pivot cup for selective rotation of said pivot cup about said post;
   said pivot cup located on said post, and having said complementary structure for interlocking, and non-rotatable structure for non-rotatable attachment to said shell and sleeve, said non-rotatable structure located about an outer peripheral surface of said pivot cup, said non-rotatable structure on said pivot cup sliding into said first structure on said shell;
   said non-rotatable structure is formed at at least two locations spaced circumferentially relative to a central axis of said post; and
   said post including a webbed conical structure, and said pivot cup has a matching conical shape adjacent a base of said pivot cup, said second structure includes flat surfaces on the surface of said webbed conical structure and said complementary structure has corresponding flat surfaces on said pivot cup.

15. The mirror assembly of claim 14, wherein the non-rotatable structure includes splines formed by two spaced members on an outer peripheral surface of said pivot cup, and slots on an inner peripheral surface of said sleeve which receive said splines.

16. A method for assembling an exterior, side-mounted, rearview mirror assembly comprising the steps of:
   1) providing a mirror frame having a sleeve and means for slidably receiving a pivot cup within said sleeve in a non-rotatable fashion;
   2) providing a support piece for attachment to a vehicle, having a post and complementary structure for limiting rotation of said pivot cup about said post;
   3) providing said pivot cup selectively rotatable about said post, and having complementary means for interlocking said post and cup adjacent the base of said pivot cup and means for non-rotatable attachment to said mirror frame located about the periphery of said pivot cup;
   4) placing said pivot cup axially on said post such that said past and cup interlocking means mesh and attaching a spring biasing said pivot cup on said base; and
   5) then matching said means for receiving said pivot cup with said means for non-rotatable attachment and sliding said sleeve over said pivot cup until said receiving means and said non-rotatable attachment means are fully engaged.

17. The method of claim 16, wherein 6) said pivot cup is rotatable with said sleeve on said post.

* * * * *